US012167354B2

(12) United States Patent
Baglin (10) Patent No.: US 12,167,354 B2
(45) Date of Patent: Dec. 10, 2024

(54) DEVICE AND METHOD FOR MINIMISING LATENCY IN A V2X COMMUNICATION NETWORK

(71) Applicants: Nissan Motor Co., Ltd., Yokohama (JP); RENAULT S.A.S., Boulogne-Billancourt (FR)

(72) Inventor: Matthieu Baglin, Tournefeuille (FR)

(73) Assignee: Nissan Motor Co., Ltd., Kanagawa (JP)

( * ) Notice: Subject to any disclaimer, the term of this patent is extended or adjusted under 35 U.S.C. 154(b) by 391 days.

(21) Appl. No.: 17/786,978

(22) PCT Filed: Nov. 30, 2020

(86) PCT No.: PCT/EP2020/083930
§ 371 (c)(1),
(2) Date: Jun. 17, 2022

(87) PCT Pub. No.: WO2021/121929
PCT Pub. Date: Jun. 24, 2021

(65) Prior Publication Data
US 2023/0025082 A1 Jan. 26, 2023

(30) Foreign Application Priority Data
Dec. 19, 2019 (FR) ...................... 1914958

(51) Int. Cl.
*H04W 56/00* (2009.01)
*H04L 67/12* (2022.01)
*H04L 67/52* (2022.01)

(52) U.S. Cl.
CPC ......... *H04W 56/0015* (2013.01); *H04L 67/12* (2013.01); *H04L 67/52* (2022.05)

(58) Field of Classification Search
CPC ..... H04W 56/0015; H04W 4/40; H04W 4/02; H04W 72/12; H04L 67/12; H04L 67/52; G08G 1/005
See application file for complete search history.

(56) References Cited

U.S. PATENT DOCUMENTS

2017/0290033 A1* 10/2017 Blasco Serrano .... H04W 72/12
2019/0051151 A1* 2/2019 Mueck .................. G08G 1/005

FOREIGN PATENT DOCUMENTS

WO 2017/168364 A1 10/2017

OTHER PUBLICATIONS

ETSI EN 302 637-2 V1.3.2; "Intelligent Transport Systems (ITS); Vehicular Communications; Basic Set of Applications; Part 2: Specification of Cooperative Awareness Basic Service"; Nov. 2014 (44 pages).

* cited by examiner

*Primary Examiner* — Vinncelas Louis
(74) *Attorney, Agent, or Firm* — Osha Bergman Watanabe & Burton LLP (57) ABSTRACT

The invention relates to a method implemented in a V2X device (2) for exchanging V2X messages comprising data packets with one or more receiving V2X devices connected via a cellular communication network (4), the method comprising the steps of (a) running one or more V2X applications, running a V2X application comprising the generation of V2X message data associated with the V2X application, (b) transmitting the V2X message data to a distribution interface (203) at an injection time, and (c) transmitting the V2X message, in a format which is encoded using the message data retrieved from the distribution interface (203), to the receiving V2X devices via a radio link, using radio access technology, at a send time. The injection time is determined on the basis of an initial injection time defined (Continued)

by a predefined period. The method comprises a step of calculating the injection time of a current message on the basis of the initial injection time and time information relating to at least one previous V2X message sent by the V2X device via the radio link, the time information relating to a previous message comprising the injection time of the previous message into the distribution interface and the send time of the previous V2X message by the V2X communication device via the radio link.

13 Claims, 9 Drawing Sheets

DEVICE AND METHOD FOR MINIMISING LATENCY IN A V2X COMMUNICATION NETWORK

TECHNICAL FIELD

The invention relates generally to communication networks and in particular to a V2X device and a method for sending V2X messages in a V2X communication network.

BACKGROUND ART

Inter-vehicle communication technologies have undergone major growth in recent years to improve road safety and optimize road traffic. Such communication technologies are deployed in smart transport systems (ITS) between connected vehicles, to allow communication between the vehicles and their environment.

The ITS systems are based on the broadcasting of short base safety messages (BSM) according to so-called inter-station ITS radio access technologies, for example between vehicles (V2V), between vehicles and infrastructures (V2I), and between vehicles and pedestrians (V2P). The broadcasting of such messages makes it possible to trigger suitable actions in real-time situations, such as a warning in case of collision detection, or an emergency stop action in case a hazard is detected.

The V2X messages (notably V2V, V2I and V2P) can be exchanged according to different types of communications relying on a radio access technology, such as, for example:
- direct V2V communications based on short-range technologies, such as, for example, the dedicated short-range communications (DSRC) which can be based on the IEEE 802.11p standard, the PC5-mode 4 technology derived from the cellular technologies based on the 3GPP version 14 standard, or the 5G technology based on the 3GPP version 16 standard;
- indirect communications (V2N2V) using 4G or 5G connectivity (via the air interface, also called Uu interface, for the LTE and 5G networks).

The time synchronization between the ITS stations is fundamental inasmuch as the information broadcast in the V2X messages is time stamped and needs to be interpreted correctly by the receiving ITS stations. It is known practice to use a common GNSS (global navigation satellite system) satellite positioning system source to synchronize the times of the existing ITS devices.

In the existing approaches, the V2X messages sent over the V2X communication network are time stamped by the ITS station which sends them by using a V2X message data generation time which is generally periodic when the V2X messages are sent regularly.

An ITS station transmits its V2X messages in the V2X network with better clock precision. In particular, the ITS systems are configured such that, when the absolute value of the maximum difference between the clock time of the ITS station and the time base (time reference of the ITS system) is above a time threshold currently set at 200 ms, the ITS station is not authorized to send V2X messages.

Different types of V2X messages can be exchanged. For example, for messages of CAM (cooperative awareness messages) type, a particular model can be used for the overall latency of the message. The sending of a message by an ITS station comprises an encoding by the transmitting ITS station during an encoding time, the transport of the message by a radio access technology to a receiving ITS station during a transmission time and the decoding of the V2X message by the ITS station during a decoding time. The transmission time of the message according to the radio access technology cannot be compressed. In fact, this transmission time is standardized and cannot be reduced significantly without changing the interoperability with the other ITS stations.

To send a V2X message, a V2X application of an ITS station first places the V2X message on a feeder interface, at an injection time (or generation time). At the injection time, the message is sampled but not yet sent over the radio access network. The message is then encoded and sent over the radio link by means of a radio access technology.

Each V2X message that has to be sent by an ITS station to receiving ITS stations thus carries time stamping information corresponding to its injection time. The time difference between the generation time of a V2X message and the effective sending time of the message over the radio access network can constitute a significant latency. Moreover, the time difference between the time when a V2X message is transmitted over the feeder interface and the sending time of the message cannot be predicted a priori and consequently cannot be compensated.

Certain cases of use require a particularly short latency to function. Examples that can be cited include the case of cooperative systems such as platooning (the grouping of vehicles in bunches), which require an exchange of information between the vehicles with a latency less than 10 ms.

SUMMARY OF INVENTION

Problems to be Solved by Invention

There is therefore a need for a method and a device for minimizing latency in an ITS station.

Means for Solving Problems

The invention improves the situation by proposing a method implemented in a V2X device for exchanging V2X messages comprising data packets with one or more receiving V2X devices connected via a cellular communication network.

The method comprises the steps of:
running one or more V2X applications, running a V2X application comprising the generation of V2X message data associated with the V2X application,
transmitting said V2X message data over a feeder interface, at an injection time, and
transmitting the V2X message in a format that is encoded on the basis of the message data retrieved over the feeder interface to said at least one receiving V2X device, via a radio link, by using a radio access technology, at a sending time.

Advantageously, the injection time is determined on the basis of an initial injection time defined by a predefined period, the method comprising a step of calculating the injection time of a current message on the basis of the initial injection time and of time information relating to at least one preceding V2X message sent by the V2X device via the radio link, the time information relating to a preceding message comprising the injection time of the preceding message on the feeder interface and the time of sending of the preceding V2X message by the V2X communication device via the radio link.

In one embodiment, the step of calculation of the injection time can comprise a calculation of the time difference between a time relating to the sending time of the preceding V2X message and the injection time of the preceding message, the injection time of the V2X message being calculated by determining whether at least one condition relating to said time difference and to at least one predetermined threshold is satisfied.

The injection time of a current V2X message can be an affine function of the initial injection time defined by said period, having a directing coefficient equal to 1 and an ordinate at the origin that is positive or negative as a function of said conditions relating to the time difference and to at least one predetermined threshold.

According to a particular aspect, the time period can be is a multiple of a reference time value, and in that the ordinate at the origin is set at a negative value if said difference is greater than or equal to the reference time value.

The ordinate at the origin can be set at a negative value if the difference is strictly lower than a predefined upper threshold.

Alternatively, the ordinate at the origin can be set at a positive value if the difference is strictly higher than a predefined upper threshold.

The value of the ordinate at the origin can depend on the processing load of the V2X method.

In particular, the ordinate at the origin can depend on the load of the processors used to execute the method.

The information generated in a V2X message can be collected synchronously or asynchronously, after the triggering of the injection.

Also proposed is a V2X device configured to exchange V2X messages comprising data packets with one or more receiving V2X devices connected to said V2X device via a cellular communication network, said V2X device comprising:
- an application module running one or more V2X applications, the application module being capable of generating V2X message data associated with one or more V2X applications of the application module,
- a feeder interface on which are placed V2X message data generated by a V2X application of the application module, at an injection time,
- a V2X communication module configured to receive said V2X message data via the feeder interface, and to transmit the V2X message in an encoded format to said at least one receiving V2X device, via a radio link, by using a radio access technology, at a sending time.

The injection time is determined on the basis of an initial injection time defined by a time period. Advantageously, the V2X device comprises an injection time computer configured to calculate the injection time of a V2X message on the basis of the initial injection time and of time information relating to at least one preceding V2X message sent by the V2X device via the radio link, the time information relating to a message comprising the injection time of the data of the preceding V2X message on the feeder interface and the time of sending of the preceding V2X message by the V2X communication device over the radio link.

In one embodiment, the injection time computer can be configured to calculate the time difference between a time relating to the sending time of the preceding V2X message and the injection time of the preceding message, and to calculate the injection time of a current V2X message by determining whether at least one condition relating to the time difference and to at least one predetermined threshold is satisfied.

In one embodiment, the communication module can be configured to send a notification to the application module, in response to the sending of a V2X message to said receiving V2X devices, the time relating to the sending time of the preceding V2X message on which the difference depends being the sending time of the notification.

In one embodiment, the processing load of the V2X communication module can depend on the position of the V2X device sent by a positioning system, and in that the device implements a synchronization mechanism to obtain position information from the positioning system at an optimal time defined with respect to the initial injection time of a new V2X message.

The value of the ordinate at the origin can depend on the processing load of the V2X communication module.

The communication unit can be implemented on a computer system comprising at least one processor, and the ordinate at the origin can depend on the load of the processors.

The embodiments of the invention thus allow a reduction of the latency between the time when a message (injection time) is transmitted over the feeder interface (generation time) and the actual time when the message is sent over the air via the radio link by the V2X communication module.

BRIEF DESCRIPTION OF DRAWINGS

Other features, details and advantages of the invention will emerge on reading the description which is given with reference to the attached drawings that are given by way of example and which represent, respectively.

MODE(S) FOR CARRYING OUT THE INVENTION

Figure 1:
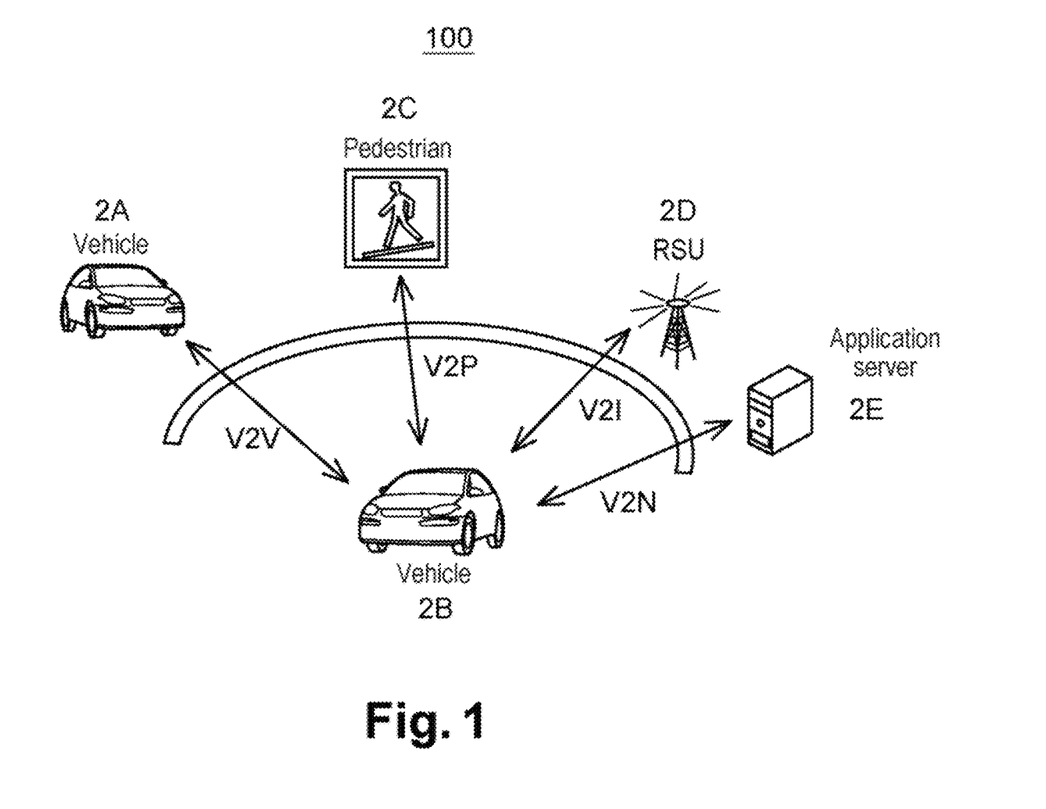
FIG. 1 represents an example of operational environment in which the invention can be implemented.

FIG. 1 represents an example of operational environment 100 of a smart transport system ITS in which an ITS station (also called ITS device) can be used, according to some embodiments.

An ITS system allows the exchange of V2X messages between a transmitting ITS station (for example 2-A) and a receiving ITS station (for example 2-B). An ITS station is also more generally called a V2X device in the present description.

The transmission of V2X messages between two ITS stations 2 can be done by means of a wireless communication network.

The environment 100 forms a smart transport architecture that can be used to manage safety and optimize the efficiency of road traffic by using V2X wireless communications between a transmitting ITS station (for example 2-A) and a receiving ITS station (for example 2-B) that are connected.

An ITS station, generically designed by the reference 2, can be:
- a piece of vehicle equipment 2A or 2B;
- a piece of pedestrian equipment 2C such as, for example, a mobile device with which a pedestrian is equipped;
- a road infrastructure 2D (also called roadside unit or RSU); or
- an application server 2E.

ITS stations 2 of the same type or of different types can exchange with one another (send or receive) V2X messages via a data transport conforming to 3GPP. Depending on the types of the ITS stations communicating with one another pairwise, the V2X communication can notably be a V2V, V2I or V2N communication:
- in a V2V communication, the V2X communication takes place between a transmitting vehicle 2A and a receiving vehicle 2B, each running a V2V application;
- in a V2I communication, the V2X communication takes place between a vehicle 2B and a road infrastructure 2D (RSU), each of these two ITS stations using a V2I application; a road infrastructure 2D supports a V2I service for sending and/or receiving data to/from the vehicle 2B by using the V2I application;
- in a V2N communication, the V2N communication takes place between a vehicle 2B and a V2X application server 2E distributing a V2X service to receiving ITS stations 2, via a cellular communication network.

Figure 2:
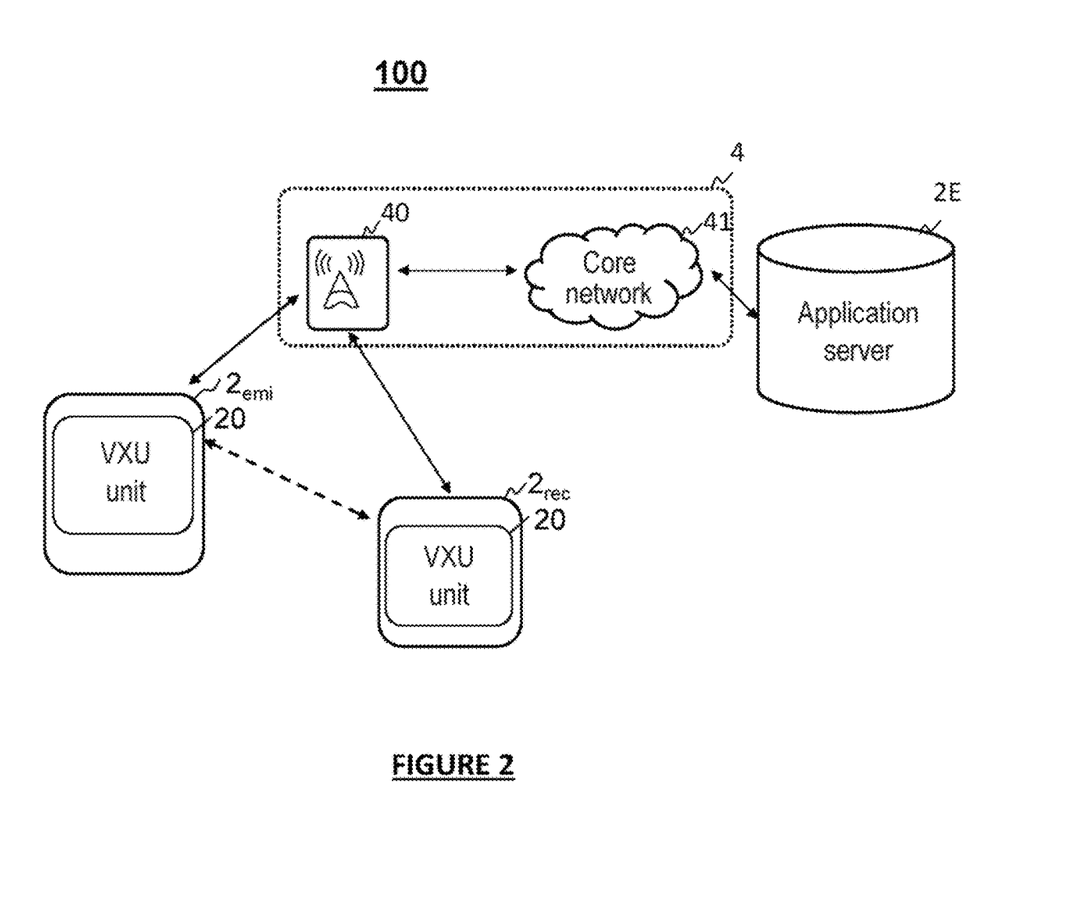
FIG. 2 illustrates the exchange between two ITS stations connected to one another via a communication network.

As shown in FIG. 2, each ITS station 2 is equipped with a communication unit 20 (also called hereinbelow "VXU unit") configured to allow a communication of V2X messages relating to one or more V2X applications with other ITS stations.

For example, each ITS station of vehicle 2B (or 2A) type can use its communication unit 20 to allow a communication relating to one or more V2X applications:
- between the vehicle 2B (or 2A) and the application server 2E distributing the V2X service to the receiving ITS stations, or
- an exchange of V2X data packets relating to one or more V2X applications between the vehicle 2B (or 2A) and receiving ITS stations 2 situated within a zone of range, by means of one or more ad hoc radio access technologies, the zone of range corresponding to the shortest range of the ad hoc radio technologies.

The radio access technology (RAT) corresponds to the underlying physical connection method used for a radio communication network, such as, for example and in a nonlimiting manner, a radio access technology of third, fourth or fifth generation (3G, 4G, 5G), an ad hoc communication of 802.11p type, an ad hoc communication of PC5 type.

An ITS station of vehicle type can be equipped with wireless communication means (transmitting and receiving) suitable for communication with the cellular network 4 and/or for communication based on radio access technology with the receiving ITS stations 2.

An ITS station 2 runs one or more V2X applications which trigger the exchange of V2X messages between the ITS stations. The V2X applications can be linked to various smart services and use environmental data acquired by the ITS stations by means of sensors and/or of cameras.

The cellular communication network 4 can comprise a base station 40 and a cellular core network 41. The communication network 4 allows a transmitting ITS station ($2_{emi}$ for example) to access a V2X service corresponding to a V2X application and to send V2X messages, in the form of encoded V2X data packets, to receiving ITS stations ($2_{rec}$ for example) via a radio access technology. The receiving ITS station receives the V2X data packets transmitted by the transmitting ITS station and decodes the received packet.

An ITS station 2 of vehicle type (2A or 2B for example) can receive data from the application server 2E via base station or stations 40 and/or the core network 41.

A transmitting ITS station 2 of vehicle type (2A or 2B) can notably use the application server 2E to relay, multi-broadcast or broadcast road traffic information or safety information or road application information to receiving ITS stations running a V2X application corresponding to that of the transmitting ITS station.

For example, a transmitting ITS station of vehicle 2 (2A for example) type can broadcast a V2V message simultaneously (for example in parallel) to several other vehicles 2B situated in proximity or a V2I message to a single road infrastructure 2D or broadcast a V2P message to all the pedestrian devices equipped with a mobile device 2C situated nearby.

The application server 2E can be of any type of server that shows up on the network (cloud server or distributed server for example) implementing data processing functions which send information that an ITS station needs.

The cellular communication network 4 can for example be an LTE network, the base stations being eNB nodes of the LTE network.

The embodiments of the invention make it possible to optimize the latency in processing V2X messages sent by the VXU communication unit of a transmitting ITS station $2_{emi}$ and received by a receiving ITS station $2_{rec}$ by the radio link by means of a radio access technology.

Figure 3:
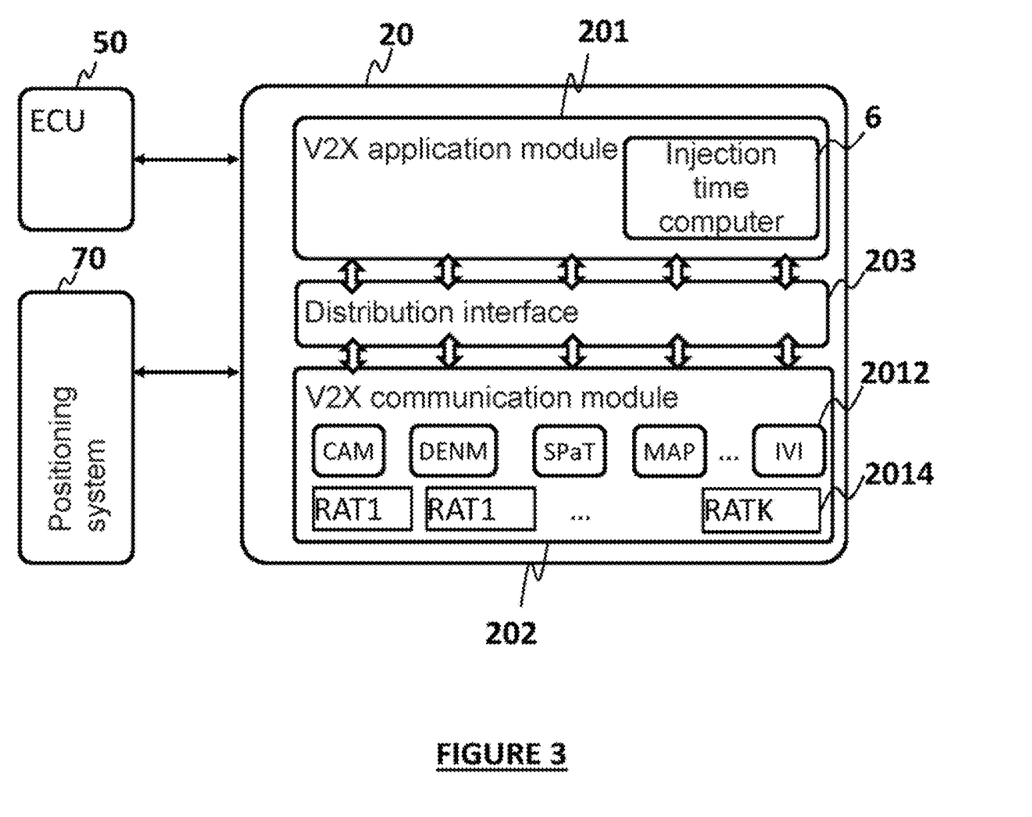
FIG. 3 is a block diagram of the VXU communication unit of an ITS station according to some embodiments.

FIG. 3 represents a VXU communication unit 20 implemented in an ITS station, according to embodiments of the invention.

A VXU communication unit 20 is used on each ITS station to perform the coding of the V2X messages to be sent and the decoding of the V2X messages received.

The VXU communication unit 20 can be connected to, even incorporated in, the electronic control unit (UCE) 50 of the ITS station which is an embedded computer which controls the physical devices of the ITS station 2.

The VXU communication unit 20 comprises a V2X communication module 201 (V2X stack) which provides a set of interfaces to an application module 202 (V2X layer). The application module 202 is configured to run one or more V2X applications allowing V2X services to be delivered to other components by transmitting V2X messages of given types. The V2X application module can comprise application elements for transmitting a V2X object or receiving a V2X event.

The V2X communication module 201 (V2X stack) communicates with a feeder interface 203 to generate the V2X message data. To send a V2X message, a V2X application of the application module 202 distributes V2X message data to a component 2012 of the V2X communication module 201 via the feeder interface 203. The V2X application of the application module 202 can also receive data from components 2012 by using suitable protocols (CAN for example). The application module 202 is thus configured to distribute V2X data to the components 2012 via the feeder interface 203 to allow the sending of V2X messages corresponding to a component 2012 (for example CAM component responsible for the sending of messages of CAM type). The V2X messages containing V2X information can thus be transmitted periodically or regularly to other ITS stations.

In one embodiment, the feeder interface can give access to the V2X message data injected at the V2X communication module, for example by opening a socket. The communication module 201 can then retrieve the V2X message data (for example on the socket) and store them in its internal variables for them to be processed in order for a V2X message to be sent. The communication module 202 can notably store V2X message time stamping information corresponding to the time of injection of the message data on the feeder interface 203 and update the values of all the fields included in the message data (for example, the speed and/or the position of the ITS station) to encode them and package them in the next V2X message which will be sent over the radio link via a radio access technology 2014.

Hereinafter in the description, an injection of V2X message will refer to an injection of V2X message data on the feeder interface 203.

Different types of V2X messages can be sent by the VXU communication unit 20 of an ITS station. Each message type is the responsibility of a corresponding component 2012 of the V2X communication module.

For example, a cooperative awareness relating to road traffic consists in ensuring that the road users (such as the vehicles 2A and 2B or the pedestrian devices 2C), and the road infrastructures D, are each informed of the position, of the dynamics and of the attributes of each other road user or infrastructure. Examples of road user comprise, without limitation, vehicles, motorbikes, bicycles, or pedestrians. Examples of road infrastructures include, without limitation, traffic signs, traffic lights, level crossing barriers, bridges, etc. To ensure such mutual awareness, information is regularly exchanged. This cooperative awareness information is packaged in a particular V2X message, called CAM (cooperative awareness message), transmitted periodically by each ITS station.

Each CAM message comprises its time stamping information which corresponds to the injection time of the message on the feeder interface 203.

An ITS station can transmit other V2X messages which are time stamped such as:
- messages called DENM (acronym for Decentralized Environmental Notification Messages). The DENIM messages are used to transmit information relating to special events or situations (such as, for example, a warning indicating roadworks, traffic jams, etc.);
- MAP messages for transmitting geographic data; an MAP message makes it possible to encode and transmit the geographic configuration of a road intersection;
- an SPAT (acronym for Signal Phase And Timing) message; the SPAT messages encode the phase and time information of a traffic light signal. The message comprises information on the signals and references of the identifiers of an MAP message to assign the phase and time information to a particular lane;
- IVI messages, transmitted by ITS stations, comprising vehicle information (IVI: the acronym for In Vehicle Information Message); such messages are transmitted to transmit data relating to information external to the vehicle, such as, for example, traffic signals located close to the road in proximity to the vehicle;
- CPM (acronym for Collective Perception Message) messages containing raw and processed data from sensors with which an ITS station of vehicle type is equipped.

In the existing embodiments, a V2X application can obtain the data from the other components only asynchronously by using particular protocols (using the CAN data bus for example) and must deliver these data to the feeder interface 203 of the V2X layer, with no prior knowledge of the time at which the next V2X message will be sent.

The V2X message data generated by an application are associated with an injection time (hereinafter called initial injection time) defined by a time period, for example according to the ETSI EN 102894-2 standard. In the existing solutions, the message data are injected on the feeder interface 203 at the initial injection time defined by the time period.

The embodiments of the invention advantageously provide an ITS station capable of injecting message data on the feeder interface at an optimized injection time calculated by an injection time computer 6.

The injection time computer 6 is advantageously configured to calculate the injection time $t_{inj}$ based on the initial injection time defined by the period and on time information relating to at least one V2X message previously sent by the ITS station via the radio link, the time information relating to a preceding message comprise the time of injection of the data of the preceding V2X message on the feeder interface and the time of sending of the preceding V2X message by the V2X communication device over the radio link, which makes it possible to reduce the latency of the ITS station.

Hereinafter the description will be given with reference to an injection time computer 6 using time information relating to only the preceding message, as a nonlimiting example. The person skilled in the art will easily understand that the invention applies equally to an injection time computer 6 using the time information relating to a plurality of preceding messages, by using a sliding window.

The VXU unit 20 of the ITS station 2 can thus generate V2X messages comprising the most recent time information, regardless of the type of message sent.

Although the embodiments of the invention apply to any type of V2X message (such as a CAM, DENM, SPAT, etc. message), the following description of the embodiments of the invention will be made primarily with reference to a message of CAM type, as a nonlimiting illustrative example.

Figure 4:
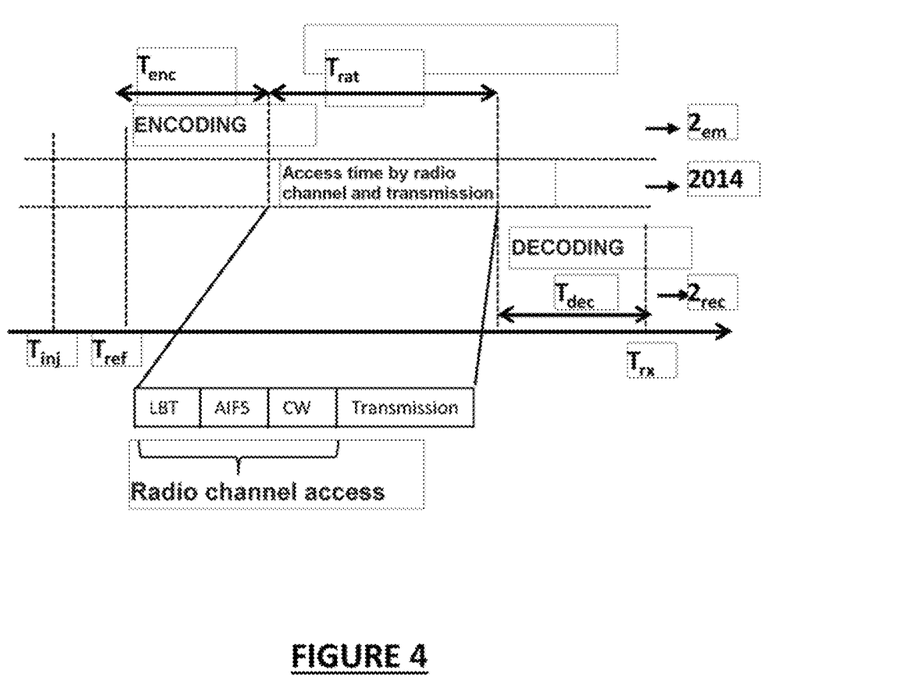
FIG. 4 is a diagram representing the processing times for the sending of a V2X message, in a transmitting ITS station, according to an embodiment of the invention.

FIG. 4 represents an example of sending of a V2X message of CAM type from a transmitting ITS station to a receiving ITS station.

As shown in FIG. 4, the sending of a V2X message from a transmitting ITS station $2_{em}$ to a receiving ITS station $2_{rec}$ comprises:
- an encoding of the V2X message by the transmitting ITS station $2_{em}$ during a time $T_{enc}$;
- the transmission of the V2X message via a radio access technology 2014 during a time $T_{RAT}$;
- the decoding of the V2X message by the V2X receiving station $2_{rec}$ during a time $T_{dec}$.

The transmission time $T_{RAT}$ of the V2X message by a radio access technology comprises the access time per radio channel and the transmission of the message.

The transmission time $T_{RAT}$ cannot be compressed. In fact, the transmission time $T_{RAT}$ cannot easily be estimated because it depends on the number of messages transmitted in the frequency band used at the time T.

According to the embodiments of the invention, the VXU communication unit 20 of an ITS station 2 is configured to timestamp each V2X message to be sent in the V2X network by using an injection time $T_{inj}$ (also hereinafter called generation time) calculated so as to reduce the latency.

The time stamping information (injection time) associated with a V2X message intended to be sent from a transmitting ITS station $2_{em}$ to one or more receiving ITS stations $2_{rec}$ corresponds to the time $T_{inj}$ which corresponds to the placement of the V2X message on the feeder interface 2010.

The embodiments of the invention advantageously make it possible to minimize the time difference between the injection time and the actual sending of the V2X message over the air interface, and consequently the latency linked to the transmission of a message.

The VXU communication unit 20 according to the embodiments of the invention is advantageously configured to reduce the difference between the generation time $T_{inj}$ of a message and the actual time of sending of this message to the receiving ITS stations 2R by using the radio access technology, by using information relating to the V2X message previously sent.

The ITS station 2 is configured to send V2X messages at different successive sending times, for example periodically.

As shown in FIG. 3, the application module 202 of the VXU unit 20 can comprise an injection time computer 6 configured to adjust the initial injection time of a V2X message $M_i$ to be sent (current message), defined by the time period, on the basis of one or more parameters relating to the V2X message $M_{i-1}$ sent previously by the ITS station at a prior time. The V2X message can then be sent over the radio link by a radio access layer 2014 of the V2X communication module 201.

In one embodiment, the injection time computer 6 can be configured to calculate the time difference injectionDelayMs between a time relating to the sending time of the preceding V2X message and the injection time of the preceding message, and to calculate the injection time of a new V2X message by determining whether at least one threshold condition relating to the time difference injectionDelayMs and to at least one predefined threshold is satisfied. This calculation thus makes it possible to set up a servocontrol loop on the $T_{inj}$.

In particular, the injection time $t_{inj\_i}$ of a V2X message $M_i$ can be an affine function $t_{inj\_i} = f(t_{inj\_init\_i})$ the initial injection time $t_{inj\_init\_i}$ defined by the time period, the function f( ) having a directing coefficient equal to 1 and an ordinate at the origin N that is positive or negative as a function of the threshold conditions relating to the time difference injectionDelayMs and to the predefined threshold or thresholds:

$$t_{ini\_i} = t_{ini\_init\_i} + N$$

In embodiments, the period defining the initial injection time is a multiple of a reference time value (100 ms for example in the case of a message of CAM type), which can notably be representative of the calculation time pitch of the computer or of the call time pitch of the functional block. In such an embodiment, it is possible to check beforehand, before testing the threshold conditions, whether the difference InjectionDelayMs is greater than or equal to the reference time value (preliminary condition). If the preliminary condition is satisfied, the next injection can be triggered at a time TIME_REMOVING_STACK_MISSED_MS for example 5 ms) to advance the next injection.

If the preliminary condition is not satisfied, the threshold conditions can be tested.

In particular, the parameter N can be set at a negative value if the difference InjectionDelayMs is strictly lower than a predefined minimum threshold DELTA_INJECTION_TIME_MIN_MS (first threshold condition). Thus, the injection of the next V2X message can be advanced with respect to the initial injection time (by 2 ms for example).

If the first threshold condition is not satisfied, the parameter N can be set at a positive value if the difference InjectionDelayMs is strictly above a predefined upper threshold DELTA_INJECTION_TIME_MAX_MS (second threshold condition). Thus, the injection of the next message can be delayed with respect to the initial injection time (by 2 ms for example).

In one embodiment, the parameter N (time added or subtracted depending on the threshold condition) can depend on the processing load of the V2X communication module 201 (time taken by the communication module to encode a message).

The communication unit 20 can be implemented on a computer system comprising at least one processor. In embodiments, the parameter N (time added or subtracted depending on the threshold condition) can then depend also or as a variant on the processing load of the processors (CPU load for example).

In one embodiment, when a V2X message is sent by the VXU communication unit 20 of an ITS station 2 via the radio link by using a radio access technology 2014, the V2X application 202 responsible for the sending of the message can receive a notification of the effective sending of the message (sending by the ITS station to the receiving stations) and of the sending time corresponding to the message sent over the radio link.

In such embodiments, the time relating to the time of sending of the preceding V2X message $M_{i-1}$ on which the difference InjectionDelayMs depends is the time $t_{notif}$ of reception of the notification relating to the sending of the preceding message by the application module 202. Therefore, by denoting the actual time of injection of the preceding message as $M_{i-1}$ as $t_{inj\_(i-1)}$:

$$\text{InjectionDelayMs} = t_{Notif} - t_{inj\_(i-1)}$$

The injection time computer 6 can thus adjust the injection time $T_{inj}$ of the next message on the feeder interface 2010 from a time N before the initial injection time defined by the time period. In one embodiment, the time N can be a number N of milliseconds.

Figure 5:
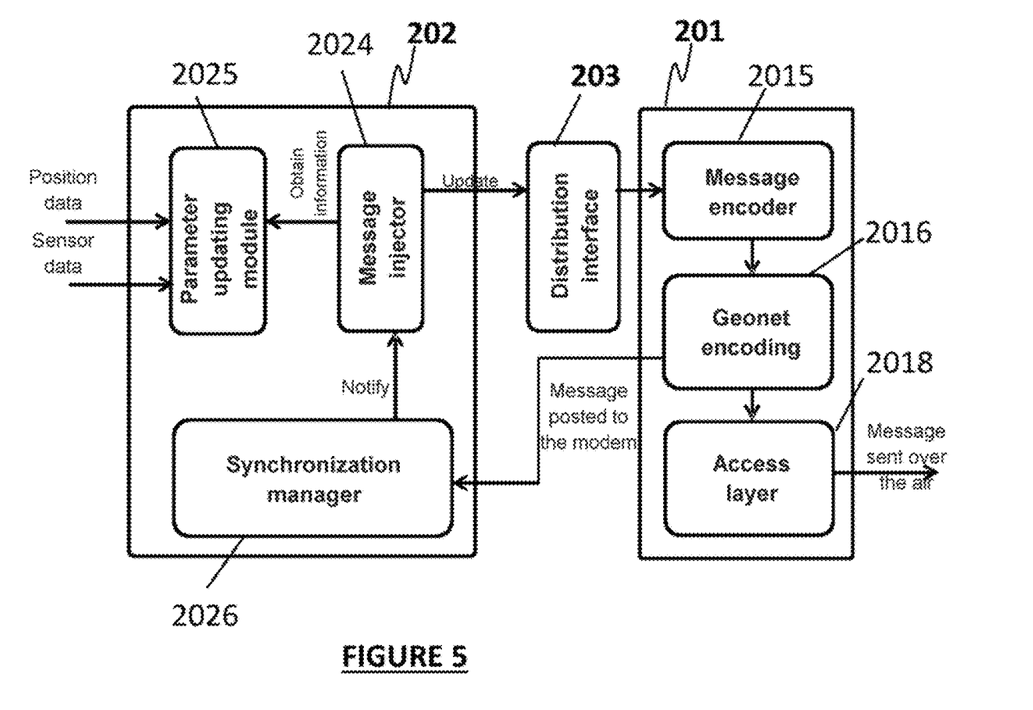
FIG. 5 is a block diagram illustrating the interactions between the application module and the communication module.

The figure is a block diagram representing the interactions between the application module 202 and the V2X communication module 201 according to some embodiments.

The application module 202 can comprise an injection synchronization manager 2026 configured to adjust the time after the sending of each V2X message notified by the V2X communication module 201, in order to avoid a time shift.

The application module 202 can further comprise a V2X message injector 2024 configured to inject the V2X message data on the feeder interface 2010 at the calculated injection time $T_{inj}$.

In embodiments, the application module 202 can comprise also a parameter updating module 2025 configured to receive discrete signals from the ITS station 2 and to update them. For example, in an ITS station of vehicle type, such discrete signals can comprise signals from sensors (sensor data) or positioning signals (position data) received from a positioning system such as a GNSS system 70. Such discrete signals can be sent regularly in time and can be stored when they are updated. In the embodiments in which the GNSS signals can be interrogated, the interrogation of the signal can be performed after the message injector 2024 has decided to trigger a new V2X message injection for the information obtained by such questioning to be as accurate as possible.

The V2X message injector 2024 can thus inject the V2X message data at the calculated injection time on the feeder interface 2020 of the V2X communication module 201, by using the parameters updated by the updating module 2024.

The V2X communication module can thus access the V2X message data to prepare the sending of the V2X message of corresponding type. The data are encoded by a message encoder 2015. A Geonet encoder 2016 can also be applied, for example the Geonet encoder 2016 encodes and adds the Geonet 3gpp header to the message. An access layer 2018 then sends the encoded message over the air by using a radio access technology.

Figure 6:
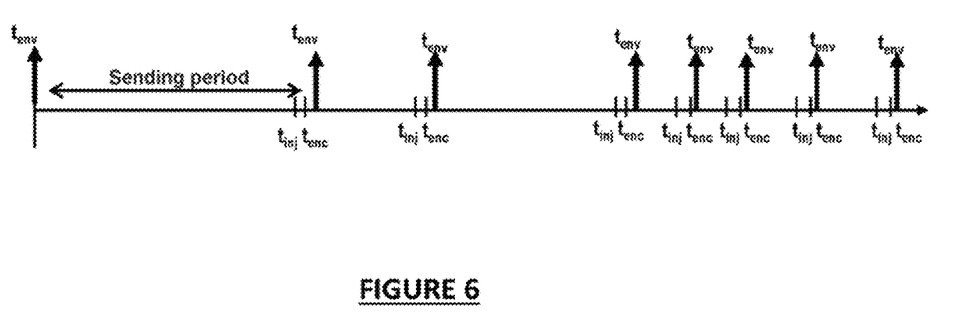
FIG. 6 is a diagram illustrating a sequence of injections of message data on the feeder interface and of sending of V2X messages over the air, in time, according to an exemplary embodiment.

FIG. 6 is a time diagram showing an example of successive sendings of V2X messages by a V2X station, with a time period between the sending of two messages which varies in time. A message is injected at $t_{inj}$, encoded at $t_{enc}$ and sent at $t_{env}$. As can be seen in FIG. 6, the time period between two successive sendings of messages is first of all long then shorter over time. Such a trending of the time period can be caused by an increase in the speed of the vehicle forcing the communication module to encode more messages per second.

In the embodiments in which the initial injection time is defined by a period (set for example by the ETSI standardization standard), the period can be a multiple of the reference time value and lie between the reference time value and a maximum period threshold. The reference value can notably be defined in milliseconds (ms) whereas the maximum period threshold can be of the order of a few seconds. For example, for V2X messages of CAM type, the reference value currently set by the ETSI standard is equal to 100 ms and the maximum threshold is equal to 1 s: thus, the CAM message sending period is a multiple of 100 ms and lies between 100 ms and 1 s according to the ETSI standard.

In embodiments, the frequency of generation of a message (V2X message injection) can be determined on the basis of information on changes of status of the ITS station, such as, for example, the position or the speed of the ITS station, or even the load of the radio channel which can be determined by a decentralized congestion controller DCC of the ITS station 2.

In one embodiment, the message injector 2024 can trigger the updating of the ITS station parameters by the updating module 2025 according to a minimum period, for example equal to the reference time value (for example 100 ms). Thus, the V2X message injector 2024 is capable of always supplying the ITS station parameters at the right time.

As a variant, the message injector 2024 can calculate the sending time $t_{env}$ of the next V2X message based on ITS station parameters determined so as to minimize the load of the feeder interface 203.

In the state of the art, the injection of a V2X message takes place randomly in the message processing window such that the injection time $t_{inj}$ can be very much earlier than the effective sending time of the message $t_{env}$ on the air link and generates a significant latency. On the contrary, as shown in FIG. 6, the embodiments of the invention make it possible to minimize the difference between the effective time of sending $t_{env}$ of the message by the access layer 2018 of the ITS station 2 and the time of injection $t_{inj}$ of the message on the feeder interface 203 by the injector 2024, as calculated by the injection time computer 6, which makes it possible to reduce the latency of the prior art.

In practice, it can be difficult to update all the ITS station 2 parameters exactly at the time of the injection except for updating them continuously. However, some parameters can be important such as the latitude and/or longitude position parameters of the ITS station stored in memory which can be updated by the updating module 2025. To optimize the accuracy of the data sent by the injector 2024 to the communication module 201, embodiments of the invention make it possible to match the ITS station position parameters stored in memory with the effective position of the ITS station at the time of the injection of a message, to prevent receiving ITS stations from not being informed of a dangerous situation at the time of the reception of the V2X messages. The ITS station position information (including the latitude and/or the longitude of the position of the ITS station) is generally supplied by GNSS systems 70, delivering position information in the form of GPS data. Such GNSS systems do however provide position information according to a given period, for example every X milliseconds, X being greater than a threshold (for example equal to 100 ms).

To obtain such an improvement in the accuracy of the injector 2024, the synchronization manager 2026 can be further configured to implement a synchronization mechanism capable of collecting, notably continuously, ITS station 2 position information that is up to date (that is to say that corresponds to the actual position of the ITS station) at the time of calculation of the injection time by the injector 2024.

In such an embodiment, the synchronization manager 2026 can guarantee that the GPS component (GPS Daemon) responsible for the retrieval of the position information (GPS information) from the GNSS systems is synchronized with the calculation of the injection time which is performed regularly. In particular, such synchronization can be performed by interrogating the GPS components or by beginning the report cycles at the right moment (i.e. so as not to delay the optimal injection time $T_{inj}$), that is to say, so as not to delay the optimal injection time.

Figure 7:
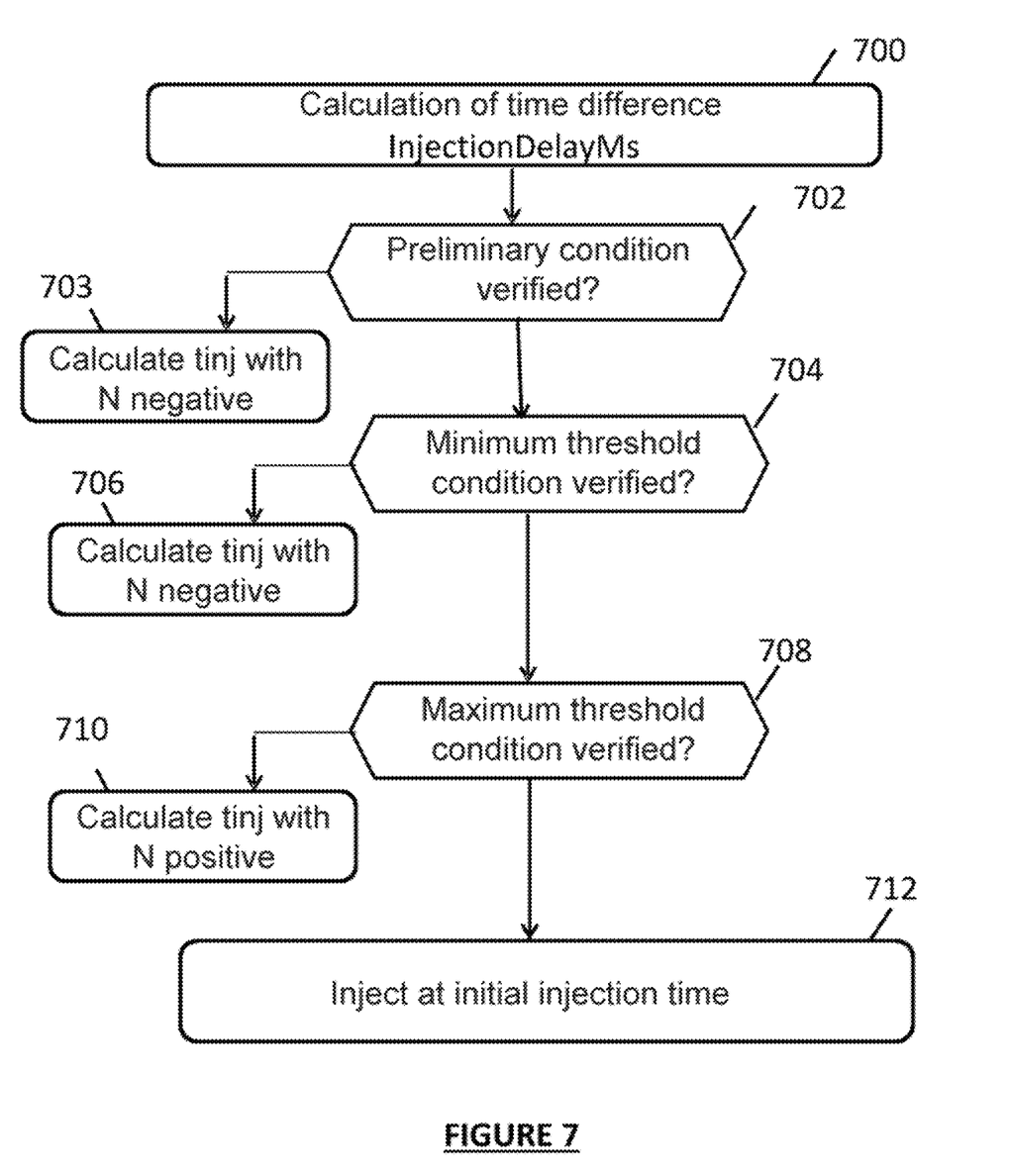
FIG. 7 is a flow diagram representing the method for calculating injection time, according to some embodiments.

FIG. 7 is a flow diagram representing the method for determining the time of injection of V2X message data by a V2X application of the ITS station, according to an embodiment.

When the application module 202 receives a notification from the communication module 201 associated with a preceding message $M_{i-1}$ sent over the air, the difference InjectionDelayMs between the time of reception of the notification $T_{Notif}$ by the application module 202 and the injection time $T_{inj\_(i-1)}$ of the message $M_{i-1}$ sent previously by the ITS station via the radio link is calculated in the step 700:

$$\text{InjectionDelayMs} = t_{Notif} - t_{inj\_(i-1)}$$

It is considered that the injections have a minimum periodicity CHECK PERIOD MS defined by a period equal to the reference time value (for example 100 ms for a CAM message). The minimum periodicity (or minimum period) CHECK PERIOD MS thus corresponds to the minimum period which must be observed between the sending of two V2X messages.

If the application module 202 injects message data at an injection time which is too close to the sending time of a V2X message sent over the air by the communication module 201, that is to say that the difference InjectionDelayMs is less than the reference time value (minimum period), the V2X communication module 201 must in practice use injection data and parameters received previously and that are therefore obsolete because the communication module does not have the time to process the current injection. The injection time is then corrected for it to converge toward the reference time value.

Thus, in the step 702, a preliminary condition is determined to be satisfied if the delay InjectionDelayMs between the time of reception of the notification $T_{Notif}$ and the injection time $T_{inj}$ of the message is greater than or equal to the reference time value (100 ms for example):

$$\text{injectionDelayMs>=CHECK\_PERIOD\_MS} \quad (1)$$

If the preliminary condition (1) is borne out, the minimum sending time defined for the V2X message type considered is exceeded.

In the step 703, the V2X application is then activated at a time TIME_REMOVING_STACK_MISSED_MS prior to the defined initial injection time $t_{inj\_init}$ by a predefined value N (for example of the order of a few milliseconds). In such an embodiment, the injection has not been performed correctly and, to compensate this injection failing, the application is woken up earlier, the new injection of V2X message data being consequently performed earlier than the initially defined injection time $t_{inj\_init}$.

Otherwise, if the condition (1) is not borne out, a determination is made as to whether the difference InjectionDelayMs is strictly below a lower threshold DELTA_INJECTION_TIME_MIN_MS, in the step 704 (minimum threshold condition):

$$\text{injectionDelayMs<DELTA\_INJECTION\_TIME\_MIN\_MS} \quad (2)$$

If the minimum threshold condition (2) is borne out, the preceding injection corresponds to a latency that is satisfactory but which remains below the optimal threshold. The injection time of the next message is then determined to make the difference InjectionDelayMs between the injection time and the actual sending time of a message converge toward the optimal value in the step 706, the optimal value is the closest possible to 0 and depends on the CPU (notably its load, on its computation power, etc.). In one embodiment, the step 706 can be performed by activating an injection of message data by the V2X application responsible for the sending of the messages of the type considered, earlier with respect to the initial injection time $t_{inj\text{-}init}$, by choosing N to be negative (the injection can for example be advanced by 2 ms).

The function f( ) which activates the injection of a message at a given time can correspond to the wake-up function of the V2X application of the application module 202, the application activating an injection of V2X message data each time a wake-up is triggered. Thus, in the step 706, the application can be woken up earlier.

In the step 708, if the minimum threshold condition (2) is not satisfied, it is possible to determine whether the difference InjectionDelayMs is strictly above an upper threshold DELTA_INJECTION_TIME_MAX_MS (upper threshold condition):

$$\text{injectionDelayMs>DELTA\_INJECTION\_TIME\_MAX\_MS} \quad (3)$$

If the maximum threshold condition (3) is borne out, the preceding injection generates an excessive delay between the sending of the preceding message and the injection time of the preceding message. The injection time of the next message is then determined to make the difference InjectionDelayMs between the injection time and the actual sending time of a message reconverge toward an optimum value, in the step 710. The optimum value can be a value as close as possible to 0. It can notably depend on the CPU processor. For example, it can be equal to 20 ms or, preferentially, to 10 ms. In one embodiment, the step 710 can be performed by activating an injection of message data by the V2X application responsible for the sending of the V2X messages of the type considered, later, by choosing N to be positive (N can, for example, be equal to 2 ms).

For example, in the step 710, the application of the application module 202 can be woken up later, on the next message injection.

Otherwise, if none of the conditions (1) to (3) is satisfied, the latency represented by the difference injectionDelayMs lies between the lower threshold (DELTA_INJECTION_TIME_MIN_MS) and the upper threshold DELTA_INJECTION_TIME_MAX_MS, and is therefore satisfactory. The injection time is then not adjusted and the application can be woken up at the time defined by default in the step 712.

As a variant, the conditions (2) and (3) of the steps 704 and 708 can be replaced by a single condition by comparing the absolute value of the difference injectionDelayMs to a single threshold and by performing the steps 706 or 710 based on the result of the comparison, similarly.

The embodiments of the invention thus make it possible to reduce the V2X message processing latency on the receiving ITS station side, thus guaranteeing a better responsiveness at the receiving ITS station and by favoring the implementation of applications or of use cases in which the latency must be lower than a certain threshold.

Figure 8:
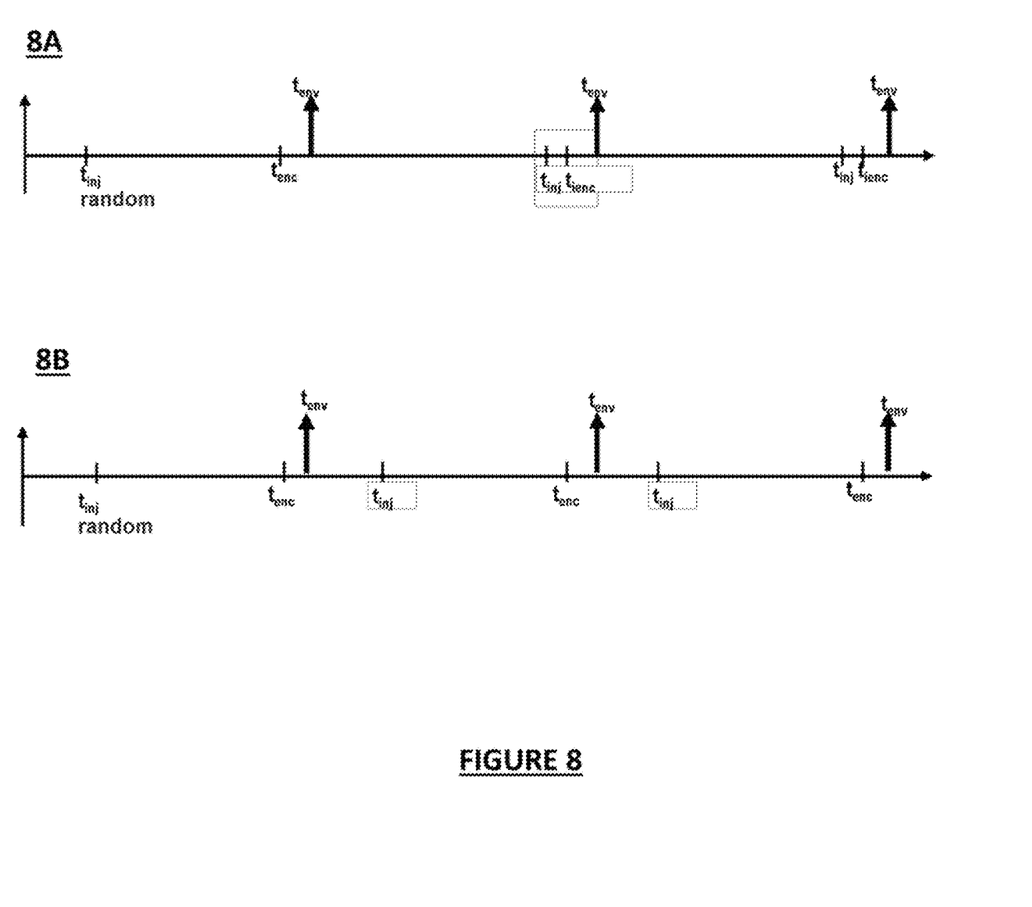
FIG. 8 illustrates the gain obtained with the V2X device and the V2X message sending method, according to an embodiment of the invention.

FIG. 8 shows two diagrams representing the gain obtained according to the embodiments of the invention.

The first diagram 8A shows the injection times $t_{inj}$ of the messages on the feeder interface 203 and the actual sending times $t_{env}$ of messages via the radio link, according to the embodiments of the invention.

The second diagram 8B shows the injection times $t_{inj}$ of the messages over the feeder interface 203 and the actual sending times $t_{env}$ of messages via the radio link, according to the prior art.

As shown in the first diagram 8A, the injection time $T_{inj}$ of a current V2X message is calculated as a function of the parameters associated with the preceding message, after the actual sending of the preceding message by the access layer 2018 of the V2X module 201 via the radio link, according to the embodiments of the invention. As shown in the diagram 8A, the injection time of the first V2X message is calculated randomly but the next injection times are optimized based on the parameters associated with the messages sent previously. The encoding of the message is performed after the injection by the V2X communication module 201. Thus, while the injection time of the first message may be far apart from the actual sending of the message via the radio link, the difference between the injection time and the sending time of the subsequent messages is minimized. Thus, the injection frequency can be variable, with a significant time difference between the injection of a message and the sending thereof.

On the contrary, in the embodiments of the prior art, the injection times of the messages following the injection of the first message are random, as illustrated in the diagram 7B. The difference between the injection time $t_{inj}$ of a message and the sending time $t_{env}$ the message via the radio link can thus be significant and strongly impact the latency.

Figure 9:
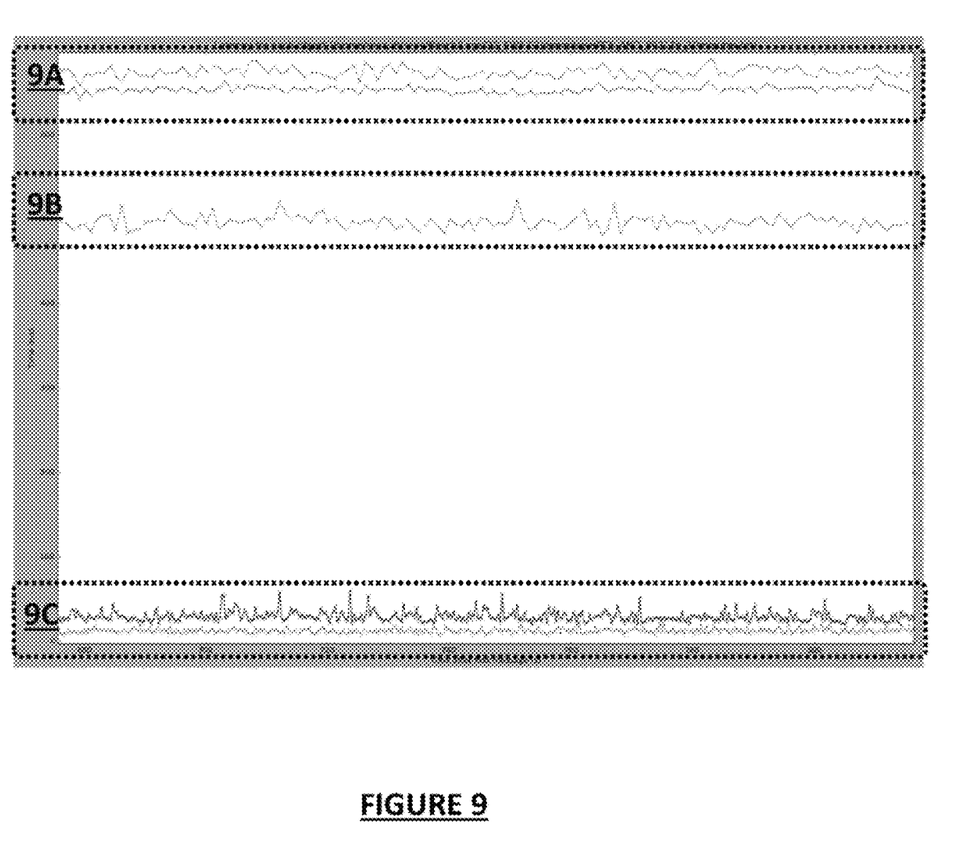
FIG. 9 is a diagram illustrating the reduction of the latency time by application of the method according to an embodiment of the invention, compared to the state of the art.

FIG. 9 shows three curves representing the latency captured by an ITS station receiving messages of CAM type from a transmitting ITS station.

The first two curves 9A and 9B represent the latency of two ITS stations sending V2X messages according to two different radio access technologies (PC5 and 802.11p), according to the prior art. The last curve 9C represents the reduction of latency obtained by calculating the injection time according to the embodiments of the invention, for an ITS station using the two radio access technologies PC5 and 802.11p.

As represented on the curve 9A, the latencies of the ITS stations of the prior art are greater than 500 ms. Such latencies are due to the fact that the injection time of a message on the feeder interface 2010 is conventionally random.

The latency corresponds to the time of access per radio channel and of transmission of the message.

The embodiments of the invention thus provide an ITS station that has a latency lower than the minimum period of the messages defined by the reference time value (100 ms for example for messages of CAM type), regardless of the speed of the ITS station and of the periodicity of sending of the CAM messages.

The person skilled in the art will understand that the system or subsystems according to the embodiments of the invention can be implemented in various ways, by hardware, software, or a combination of hardware and software, notably in the form of program code that can be distributed in the form of a program product, in various forms. In particular, the program code can be distributed using computer-readable media, which can include computer-readable storage media and communication media. The methods described in the present description can notably be implemented in the form of computer program instructions that can be executed by one or more processors in a computer computing device. These computer program instructions can also be stored in a computer-readable medium.

Moreover, the invention is not limited to the embodiments described above by way of nonlimiting examples. It encompasses all the variant embodiments which will be able to be envisaged by the person skilled in the art. In particular, the person skilled in the art will understand that the invention is not limited to a particular type of ITS station and applies generally to any device capable of exchanging V2X messages with another device, according to the V2X protocol (for example any vehicle such as a car, a truck, a motorbike, a bus, a cyclist or a user device of a pedestrian). Furthermore, the invention is not limited to a particular physical access layer and applies generally to any radio access technology (for example 802.11 p, C-V2X, 5G, etc.). Moreover, the invention is not limited to a particular type of V2X message.

The invention claimed is:

1. A method implemented in a V2X device for exchanging V2X messages comprising data packets with one or more receiving V2X devices connected via a cellular communication network, the method comprising the steps of:
    running one or more V2X applications, running a V2X application comprising the generation of V2X message data associated with the V2X application,
    transmitting said V2X message data over a feeder interface, at an injection time, and
    transmitting the V2X message in a format encoded on the basis of the message data recovered over the feeder interface to said at least one receiving V2X device, via a radio link, by using a radio access technology, at a sending time,
    characterized in that the injection time ($t_{inj}$) is determined on the basis of an initial injection time defined by a predefined period and in that the method comprises a step consisting in calculating the injection time of a current message on the basis of the initial injection time and of time information relating to at least one preceding V2X message sent by the V2X device via the radio link, the time information relating to a preceding message comprising the injection time of the preceding message on the feeder interface and the time of sending of the preceding V2X message by the V2X communication device via the radio link.

2. The method as claimed in claim 1, characterized in that the step of calculation of the injection time comprises a calculation of the time difference between a time relating to the time of sending of the preceding V2X message and the injection time of the preceding message, the injection time of the V2X message being calculated by determining whether at least one condition relating to said time difference and to at least one predetermined threshold is satisfied.

3. The method as claimed in claim 2, characterized in that the injection time of a current V2X message is an affine function of the initial injection time defined by said period, having a directing coefficient equal to 1 and an ordinate at the positive or negative origin as a function of said conditions relating to the time difference and to at least one predetermined threshold.

4. The method as claimed in claim 3, characterized in that said period is a multiple of a reference time value, and in that the ordinate at the origin is set at a negative value if said difference is greater than or equal to the reference time value.

5. The method as claimed in claim 3, characterized in that the ordinate at the origin is set at a negative value if said difference is strictly lower than a predefined upper threshold.

6. The method as claimed in claim 3, characterized in that the ordinate at the origin is set at a positive value if said difference is strictly higher than a predefined upper threshold.

7. The method as claimed in claim 2, characterized in that the value of the ordinate at the origin depends on the processing load of the V2X method.

8. The method as claimed in claim 2, characterized in that the ordinate at the origin depends on the load of the processors used to execute the method.

9. The method as claimed in claim 2, characterized in that the information generated in a V2X message is collected synchronously or asynchronously, after the triggering of the injection.

10. A V2X device configured to exchange V2X messages comprising data packets with one or more receiving V2X devices connected to said V2X device via a cellular communication network, said V2X device comprising:
    an application module running one or more V2X applications, the application module being capable of generating V2X message data associated with one or more V2X applications of the application module,
    a feeder interface on which are placed V2X message data generated by a V2X application of the application module at an injection time,
    a V2X communication module configured to receive said V2X message data via the feeder interface, and to transmit the V2X message in an encoded format to said at least one receiving V2X device, via a radio link, by using a radio access technology, at a sending time ($t_{env}$),
    characterized in that the injection time ($t_{inj}$) is determined on the basis of an initial injection time defined by a time period and in that the V2X device comprises an injection time computer configured to calculate the injection time ($t_{inj}$) of a V2X message on the basis of the initial injection time and of time information relating to at least one preceding V2X message sent by the V2X device via the radio link, the time information relating to a message comprising the injection time of the data of the preceding V2X message on the feeder interface and the time of sending of the preceding V2X message by the V2X communication device over the radio link.

11. The device as claimed in claim 10, characterized in that the injection time computer is configured to calculate the time difference between a time relating to the sending time of the preceding V2X message and the injection time of the preceding message, and to calculate the injection time of a current V2X message by determining whether at least one condition relating to said time difference and to at least one predetermined threshold is satisfied.

12. The device as claimed in claim 10, characterized in that the communication module is configured to send a notification to the application module, in response to the sending of a V2X message to said receiving V2X devices, and in that the time relating to the sending time of the preceding V2X message on which said difference depends is the sending time of the notification.

13. The device as claimed in claim 12, characterized in that the processing load of the V2X communication module depends on the position of the V2X device sent by a positioning system, and in that the device implements a synchronization mechanism to obtain the position information from the positioning system at an optimal time defined with respect to the initial injection time of a new V2X message.

* * * * *